Patented Feb. 23, 1954

2,670,297

UNITED STATES PATENT OFFICE 2,670,297

METHOD FOR THE PRODUCTION OF A FIRE RETARDANT SOLUTION

Roy Dahlstrom, Westfield, and George E. Bronson, Matawan, N. J., assignors to National Lead Company, New York, N. Y., a corporation of New Jersey No Drawing. Application May 31, 1951, Serial No. 229,274

5 Claims. (Cl. 106—15)

1

This invention relates to preparation of a fire retardant solution. More specifically it relates to the preparation of a solution which will render cellulosic materials fire resistant.

Many types of fire resistant solutions have been prepared by many prior art processes. The composition of the prior art solutions varies considerably both in the types of ingredients employed and the compositions used. One particular type of fire retardant solution which has been particularly successful in rendering cellulosics fire resistant contains titanium chloride acylate with antimony trichloride. A process for rendering cellulosics fire resistant employing such solution and the solution itself is described and claimed in co-pending application Serial No. 134,342, filed December 21, 1949, and now abandoned.

An object of this invention is to provide an improved method for preparing a titanium chloride acylate solution containing antimony chloride. A further object is to prepare such a fire retardant solution which is capable of being stored for extended periods of time. A still further object is to prepare a stable fire retardant solution by a simple process which utilizes economical raw materials.

In its broadest aspects this invention contemplates preparation of a stable solution of titanium chloride acylate containing antimony trichloride which is capable of imparting fire resistance to cellulosic materials by inter-reacting carboxylic acid, particularly mono-carboxylic acid, water, hydrochloric acid, antimony trioxide and titanium tetrachloride. The process comprises first forming a mixture of the mono-carboxylic acid, water, hydrochloric acid and antimony trioxide, and to said mixture subsequently adding titanium tetrachloride, meanwhile maintaining temperature of said mixture between 30° C. and 50° C. during the addition of said titanium tetrachloride. Such a solution should contain a titanium concentration between 120 and 160 grams per liter, preferably between 140 and 150 grams per liter. The solution should also have present for each part by weight of titanium from 1.20 to 3.70 parts of acylate, 1.50 to 2.55 parts of antimony, and 0.75 to 2.25 parts chloride present from both the added titanium tetrachloride and the added hydrochloric acid combined, and for each part of antimony present, an additional 0.875 part of chloride. Such a solution may be prepared by employing from 476 to 634 grams of titanium tetrachloride for each liter of final solution, from 0.3 to 0.94 part by weight of organic acid for each part of titanium tetrachloride, from 0.46 to 0.79 part of antimony trioxide for each part of titanium tetrachloride and hydrochloric acid in amount such that the total amount of chloride added, calculated as hydrochloric acid, from both the hydrochloric acid added as such and the titanium tetrachloride is equal to 0.16 part of hydrochloric acid for each part of antimony trioxide plus from 0.19 to 0.58 part of hydrochloric acid for each part of titanium tetrachloride used.

It has been discovered that in order to prepare a solution which is stable enough to be capable of being stored for extended periods of time, it is preferred to have the concentrations of the various constituents fall within the above specified limits. Such a solution may be prepared by the process of the instant invention in which mono-carboxylic acid, water, hydrochloric acid and antimony trioxide are first formed into a mixture and the titanium tetrachloride is subsequently added thereto. This procedure is preferred because of the high concentration of the solution to be produced, and it has been found that such concentrations can be obtained easily by such a procedure without resorting to the use of complicated and expensive equipment. The difficulty in preparing such a solution is in maintaining the required amount of chlorine (present as chlorides) in such a concentrated solution. Normally one would dissolve the titanium tetrachloride in water then add the solid antimony trioxide to the aqueous titanium tetrachloride solution. However, because of the high concentration of titanium required in solution the amount of water used must be adjusted accordingly.

In order to prepare a solution containing concentrations of the various constituents which fall within the above specified limits, it has been found necessary to add the anhydrous titanium tetrachloride to a mixture containing all of the other constituents. It has been found that the amount of water which is employed to obtain the necessary concentration is insufficient to retain the amount of the chlorine added as titanium tetrachloride without free hydrochloric acid being formed which volatilizes from solution. However, if the antimony trioxide is present in the mixture before the titanium tetrachloride is added, sufficient antimony trichloride is formed rapidly during the addition of the titanium tetrachloride to prevent the formation and loss of hydrochloric acid during the titanium tetrachloride addition. Solutions which are both stable and concentrated as prepared by the process of this invention cannot be attained except by adding the anhydrous titanium tetrachloride to the mixture containing the antimony oxide. The concentrations cannot be attained if the ingredients are added in other orders.

In preparing such a solution it is desirable to use mono-carboxylic acid. Such carboxylic acids are soluble and inter-react readily with the other constituents to form soluble acylates. Di-basic and tri-basic carboxylic acids may also be employed provided they do not form insoluble compounds with the antimony ions. Even though most di-basic and tri-basic carboxylic acids may be utilized, it is more desirable however to employ mono-carboxylic acid, particularly acetic and formic acids for economical reasons.

Commercial antimony trioxide may be employed in this process provided it can be readily solubilized in this mixture. It is desirable to utilize a commercial grade antimony trioxide which is substantially free from objectionable impurities and particularly one which reacts readily with hydrochloric acid to form antimony trichloride.

It has been found that the temperature of the mixture should be held between 30° C.–50° C., preferably between 40° C.–45° C. during the addition of the titanium tetrachloride mixture. By maintaining the temperature of the mixture between these limits, loss by volatilization and decomposition by hydrolysis is avoided. It is usually necessary to apply refrigeration or some other means to the mixture during such titanium tetrachloride additions to remove the excessive heat evolved during the addition of the titanium tetrachloride.

In order to determine the amounts of agents to be added to form the mixture, it is necessary to add sufficient to obtain the quantities in solution which fall within the specified ranges. With respect to the amount of mono-carboxylic acid to be added, it is necessary to add sufficient to obtain from 1.20 to 3.70 parts of acylate for each part of titanium in solution. The amount of antimony trioxide added is sufficient to produce in solution from 1.50 to 2.55 parts of antimony for each part of titanium in solution. The amount of chlorides present in solution should be present in an amount from 0.75 to 2.25 parts for each part of titanium plus an additional 0.875 part for each part of antimony and should include both the chlorides from the titanium tetrachloride and the hydrochloric acid added. The amount of water to be added to the mixture will be determined by the concentration of the titanium values and the other constituents in the final solution. As previously stated, the titanium concentration should be between 120 and 160, preferably between 140 and 150 grams per liter.

In order to more fully illustrate the process of the instant invention the following examples are presented:

EXAMPLE 1

377 parts of glacial acetic acid, 371 parts of water, 38 parts of concentrated hydrochloric acid (32% HCl) and 323 parts of commercial antimony trioxide were admixed in a vessel. The vessel was equipped with cooling coils operated by a refrigeration system. 594 parts of anhydrous liquid titanium tetrachloride were added beneath the surface of the mixture which was continuously agitated. The rate of addition of the titanium tetrachloride averaged about 20 parts per minute. The temperature of the mixture was held between 30° C. and 50° C. during the entire titanium tetrachloride addition by controlling the rate of addition and by cooling the solution by means of the cooling coils operated by the refrigeration system. At the end of 30 minutes, the addition of titanium tetrachloride was discontinued and a substantially clear solution was produced which was found by analysis to have the following composition:

150 g. p. l. titanium
267 g. p. l. antimony
374 g. p. l. acetate
468 g. p. l. chloride
1.70 specific gravity This solution was used for treatment of a sample of herringbone twill cloth. A portion of the solution was diluted with water to 60 g. p. l. titanium and the cloth was immersed in the diluted solution for a period of 2 minutes. The cloth was then passed through a hand wringer to remove excess solution. The treated cloth was partially dried by exposing to the atmosphere for 2 hours to gelatinize the solution on the cloth, and then immersed for 6 minutes in a solution of sodium carbonate-sodium metasilicate containing 150 g. p. l. $Na_2CO_3$ and 16 g. p. l. $Na_2SiO_3.5H_2O$ to alkalize the solution retained on the cloth. The pH of the solution retained on the cloth after the sodium carbonate-sodium metasilicate treatment was 12.0. The excess solution was squeezed out of the cloth by again passing it through a hand wringer. The cloth was then rinsed repeatedly in tap water until the retained solution had a pH of 8.0. The entire procedure was carried out at room temperature. The treated cloth was tested for fire retardant properties by the 45° Microburner flame test, which is described more fully in the book "Flameproofing Textile Fabrics," by Robert W. Little, pp. 117–119 (Reinhold Publishing Corp. 1947).

The remainder of the undiluted solution was stored for a period of 6 months and re-examined. No appreciable change in physical appearance or characteristics was visible. A portion of the aged solution was diluted to 60 g. p. l. titanium and used for treating another sample of cloth, according to the procedure described above.

Results of the flameproofing tests on the cloth samples treated both with the fresh and with the aged solution are shown in the table, together with a control using untreated cloth.

*Table*

| Treating solution used | Freshly-made | Aged 6 mos. | None |
|---|---|---|---|
| After-flame (sec.) | 0 | 0 | specimen burned completely. |
| After-glow in uncharred area (sec.) | 0 | 0 | |
| Charred area (sq. in.) | 2.5 | 2.5 | |
| Tensile strength | good | good | |
| Hand | do | do | |
| Appearance | do | do | |

EXAMPLE 2

A solution was made according to the procedure described in Example 1 except that no HCl was added. In this particular example, sufficient chlorides were obtained from the titanium tetrachloride added and no HCl was added to the solution. The amounts of the various ingredients used to form the mixture were as follows:

528 parts of acetic acid
223 parts of water
424 parts of antimony trioxide and to the mixture were subsequently added 555 parts of titanium tetrachloride.

Upon completion of the titanium tetrachloride addition the solution was analyzed and found to contain 140 g. p. l. titanium, 350 g. p. l. antimony, 520 g. p. l. acetate, 422 g. p. l. chlorides. The solution was stored for 2 months and both the fresh and the aged solution were tested for flame retardant characteristics. The fresh and the aged solution were substantially identical in all respects, both possessing satisfactory characteristics.

EXAMPLE 3

The procedure described in Example 1 was repeated except that 219 parts of acetic acid, 523 parts of water, 281 parts of 32% hydrochloric acid, 260 parts of antimony trioxide were used. To this mixture were added 593 parts of titanium tetrachloride. The solution after completion of the titanium tetrachloride addition was analyzed and found to contain 156 g. p. l. titanium, 250 g. p. l. antimony, 228 g. p. l. acetate, 569 g. p. l. chloride.

This solution was aged and tested as described above and was satisfactory in all respects.

EXAMPLE 4

The procedure described in Example 1 was repeated except that formic acid was employed instead of acetic acid. The amounts of all of the agents described in Example 1 were employed except that 377 parts of formic acid were employed instead of acetic acid. The solution was similar to that obtained in Example 1 and it possessed satisfactory fire retardant and stability characteristics.

From the above descriptions and by the examples shown, it has clearly been demonstrated that stable solutions containing titanium chloride acylate and antimony trichloride have been prepared which are satisfactory for rendering cellulosic materials fire resistant. Such solutions are stable toward both hydrolysis and crystallization. These solutions are capable of being stored for extended periods of time without deterioration. The method contemplated by the instant invention is an extremely simple process which utilizes economical raw materials. Furthermore, solutions made in accordance with the present invention may be employed in imparting flame resistance to cellulosic materials and the ability of these solutions to impart flame resistant properties remains substantially unimpaired upon long storage.

While this invention has been described and illustrated by the examples shown, it is not intended to be strictly limited thereto, and other modifications and variations may be employed within the scope of the following claims.

We claim:

1. Method for the preparation of a stable solution capable of imparting fire resistance to a cellulosic material which comprises forming a mixture of water, hydrochloric acid and antimony trioxide and an organic acid selected from the group consisting of acetic acid and formic acid, and to said mixture subsequently adding substantially anhydrous titanium tetrachloride, meanwhile maintaining the temperature of said mixture between 30 and 50° C. during the addition of said titanium tetrachloride, said organic acid being added in an amount from 0.3 to 0.94 part by weight of organic acid for each part by weight of titanium tetrachloride, said antimony trioxide being added in an amount by weight from 0.46 to 0.79 part of antimony trioxide for each part by weight of titanium tetrachloride, said hydrochloric acid and said titanium tetrachloride being added in amount to give 0.16 part by weight of chloride, calculated as hydrochloric acid for each part by weight of antimony trioxide, and from 0.19 to 0.58 part by weight of chloride calculated as hydrochloric acid for each part by weight of titanium calculated as titanium tetrachloride and adding water in an amount to maintain in the final solution a concentration of between 120 and 160 grams of titanium per liter of solution.

2. Method according to claim 1 in which the organic acid is acetic acid.

3. Method according to claim 1 in which the organic acid is formic acid.

4. Method according to claim 1 in which the temperature of the mixture during the addition of the titanium tetrachloride remains between 40° C. and 45° C.

5. Method according to claim 1 in which the titanium concentration is between 140 and 150 grams per liter of solution.

ROY DAHLSTROM.
GEORGE E. BRONSON.

References Cited in the file of this patent

UNITED STATES PATENTS

| Number | Name | Date |
|---|---|---|
| 2,570,566 | Lane et al. | Oct. 9, 1951 |